United States Patent
Al Mulhim et al.

(10) Patent No.: US 12,116,885 B2
(45) Date of Patent: Oct. 15, 2024

(54) METHODS OF MONITORING WATER INJECTION IN SUBTERRANEAN FORMATIONS

(71) Applicant: SAUDI ARABIAN OIL COMPANY, Dhahran (SA)

(72) Inventors: Abdulrahim Khalid Al Mulhim, Hofuf (SA); Ibrahim Mohamed El-Zefzafy, Udhailiyah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 126 days.

(21) Appl. No.: 18/065,518

(22) Filed: Dec. 13, 2022

(65) Prior Publication Data

US 2024/0191617 A1 Jun. 13, 2024

(51) Int. Cl.
*E21B 47/107* (2012.01)
*E21B 43/25* (2006.01)
*E21B 47/06* (2012.01)
*G01V 1/30* (2006.01)

(52) U.S. Cl.
CPC ............ *E21B 47/107* (2020.05); *E21B 43/25* (2013.01); *E21B 47/06* (2013.01); *G01V 1/308* (2013.01)

(58) Field of Classification Search
None
See application file for complete search history.

(56) References Cited

U.S. PATENT DOCUMENTS

| | | | |
|---|---|---|---|
| 2008/0126168 A1* | 5/2008 | Carney | E21B 41/00 705/7.26 |
| 2014/0278316 A1* | 9/2014 | Dusterhoft | E21B 43/25 703/10 |

OTHER PUBLICATIONS

Lacy, L.L. and Hudson, H.G. 1995. New Step-Rate Test Analysis for Fracture Evaluation. Presented at the Low Permeability Reservoirs Symposium, Denver, Colorado. SPE-29591-MS.
Silin, D.B., Holtzman, R., Patzek, T.W. et al. 2005. Monitoring Waterflood Operations: Hall Method Revisited. Presented at the SPE Western Regional Meeting, Irvine, California. SPE-93879-MS.

* cited by examiner

*Primary Examiner* — Charles R Nold
(74) *Attorney, Agent, or Firm* — Vorys, Sater, Seymour and Pease LLP

(57) ABSTRACT

A method may include receiving a plurality of signals from a sensor deployed in a subterranean formation and performing a step-rate analysis for the subterranean formation using the plurality of signals. An ideal volumetric flow rate and pressure of water injected into the subterranean formation by a power water injector may be determined from the step-rate analysis. A cumulative volume and pressure of water injected into the subterranean formation may be determined continuously to obtain a plurality of cumulative injected water and pressure data points. A Hall plot analysis may be performed from the plurality of cumulative injected water and pressure data points. A mitigation action may be performed when a deviation from steady state within the Hall plot analysis is beyond a constant factor, wherein the mitigation action reduces the deviation from steady state.

18 Claims, 3 Drawing Sheets

METHODS OF MONITORING WATER INJECTION IN SUBTERRANEAN FORMATIONS

FIELD OF THE DISCLOSURE

The present disclosure relates generally to the operation of waterflood systems and, more particularly, to monitoring waterflood power water injectors.

BACKGROUND OF THE DISCLOSURE

Waterflooding is an essential technique in the secondary recovery of hydrocarbons. Power water injectors are specialized water pumps commonly used for waterflooding. The constant injection of water into a well by power water injectors can be challenging to maintain in practice. Hence, power water injectors require regular monitoring to ensure optimal operation. Current monitoring methods generally rely on experimental techniques, which can be time-consuming. The use of computational methods may save time by automating the monitoring process.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method may include receiving a plurality of signals from a sensor deployed in a subterranean formation. A step-rate analysis may be performed for the subterranean formation using the plurality of signals. An ideal volumetric flow rate and an ideal pressure of water injected into the subterranean formation by a power water injector may be determined from the step-rate analysis. A cumulative volume of water and a cumulative pressure of water injected into the subterranean formation may be determined continuously to obtain a plurality of cumulative injected water data points and a plurality of cumulative pressure data points. A Hall plot analysis may be performed of the plurality of cumulative injected water data points and the plurality of cumulative pressure data points. A mitigation action may be performed when a deviation from steady state within the Hall plot analysis is beyond a constant factor, wherein the mitigation action reduces the deviation from steady state.

In another embodiment, a method may include receiving a plurality of signals from a sensor deployed in a subterranean formation, wherein the subterranean formation comprises a plurality of wells. A step-rate analysis may be performed for the subterranean formation using the plurality of signals. An ideal volumetric flow rate and an ideal pressure of water injected into the plurality of wells by a plurality of power water injectors may be determined from the step-rate analysis. A cumulative volume of water and a cumulative pressure of water injected into each well may be determined continuously to obtain a plurality of cumulative injected water data points and a plurality of cumulative pressure data points for each well. A Hall plot analysis may be performed of the cumulative injected water data points and the plurality of cumulative pressure data points for each well. A mitigation action may be performed when a deviation from steady state within the Hall plot analysis for at least one well is beyond a constant factor, wherein the mitigation action reduces the deviation from steady state.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
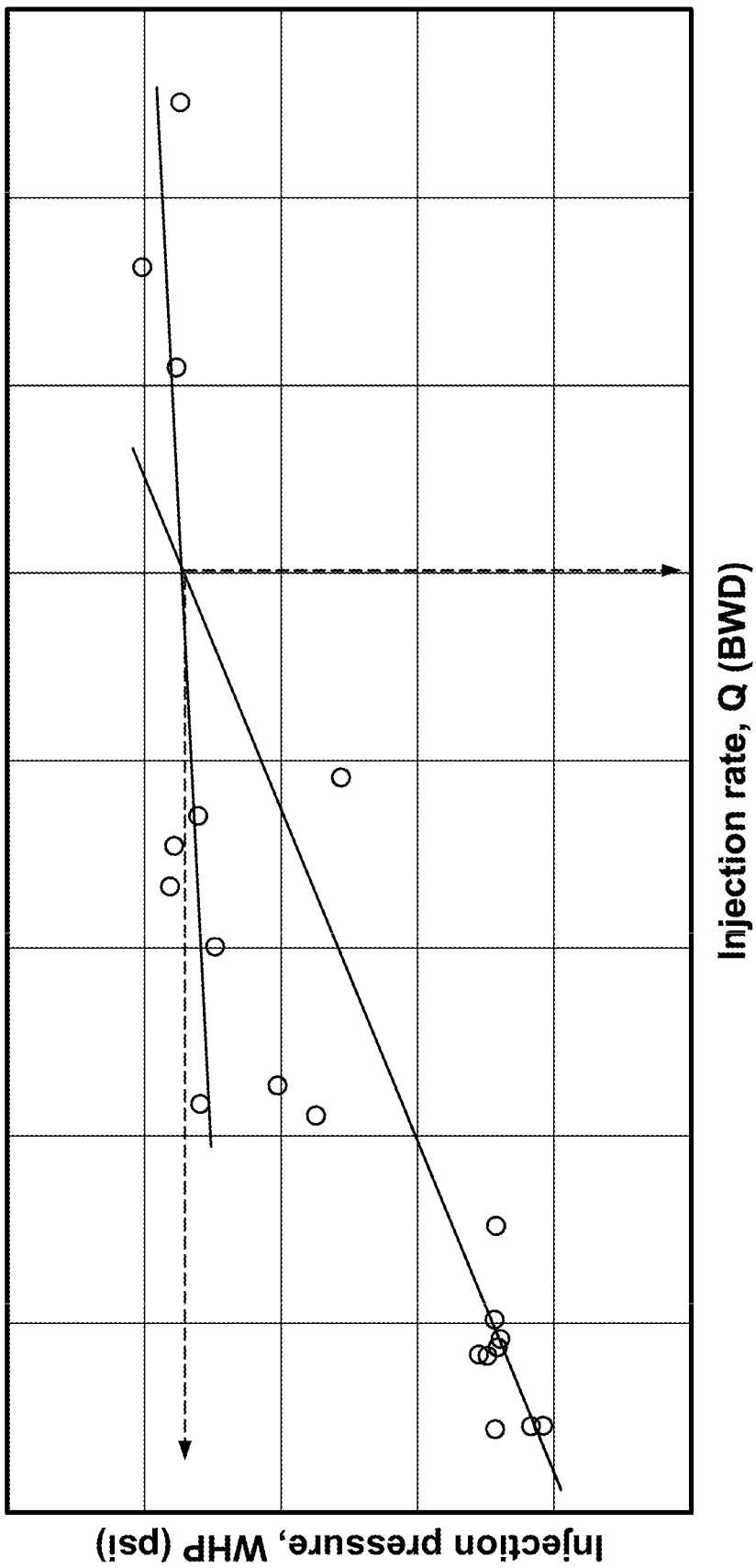
FIG. 1 is a step-rate plot developed from a step-rate analysis of a subterranean formation.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to the operation of waterflood systems and, more particularly, to monitoring waterflood power water injectors. Power water injectors are examined routinely to ensure that individual wells meet the required output specifications. The methods of the present disclosure integrate multiple diagnostic techniques to monitor the activity of power water injectors used in waterflood systems. Diagnostic techniques such as a step-rate analysis may be used to determine the ideal volumetric flow rate and pressure of the injection water and a Hall plot analysis may be used to observe changes in steady state operation of the power water injectors.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

As described herein, a "well" is a subterranean excavation or structure created by digging, driving, or drilling to access hydrocarbon reservoirs.

Methods of monitoring water injection in subterranean formations are described herein. Such methods may comprise receiving a plurality of signals from a sensor deployed in a subterranean formation and performing a step-rate analysis for the subterranean formation using the plurality of signals. The sensor may be an optical fiber and the optical fiber signals may be Rayleigh signals.

The methods described herein may be similarly used to monitor saltwater disposal wells.

In some cases, the signals may be received from the optical fiber using distributed acoustic sensing. Distributed acoustic sensing may enable continuous, real-time measurements along the entire length of the fiber optic cable. The signals may be processed using an attached optoelectronic device. The processed signals may be interpreted as physical and/or chemical measurements, such as injection pressure, flow rate, volume, or any combination thereof, and may be used in algorithms developed to model a step-rate analysis. A plot of the step-rate analysis (i.e., a step-rate plot) may be developed from the model. From the step-rate analysis, the ideal volumetric flow rate and ideal pressure of water that is to be injected into the subterranean formation by a power water injector may be determined.

The step rate analysis may, for example, be calibrated using experimentally collected step-rate data including, but not limited to, injection volumetric flow rates, injection pressures, the like, and any combination thereof.

The cumulative volume of water and cumulative pressure of water injected into the subterranean formation may be continuously determined to obtain a plurality of cumulative injected water data points and a plurality of cumulative pressure data points. The cumulative volume of water may be the multiplication product of a volumetric flow rate of water injected into the subterranean formation and a period of time. Similarly, the cumulative pressure of the water may be the multiplication product of a pressure of water injected into a subterranean formation and the same period of time.

A Hall plot analysis may be performed from the plurality of cumulative injected water data points and the plurality of cumulative pressure data points and may be used to develop a Hall plot. When a deviation from steady state beyond a constant factor, a mitigation action that reduces the deviation from steady state may be performed. The constant factor may be determined based on the historical characteristics of the subterranean formation. Such historical characteristics may include formation damage and stimulation activities.

The methods of the present disclosure may be similarly employed for a subterranean formation comprising a plurality of wells and a plurality of power water injectors. A step-rate analysis may be likewise performed for the subterranean formation using a plurality of signals received from an optical fiber deployed in the subterranean formation. The ideal volumetric flow rate and ideal pressure of water injected into the plurality of wells by a plurality of water power injectors may be determined from the step-rate analysis.

The cumulative volume of water and cumulative pressure of water injected into each well may be continuously determined to obtain a plurality of cumulative injected water data points and a plurality of cumulative pressure data points for each well. Given the plurality of cumulative injected water data points and the plurality of cumulative pressure data points for each well, a Hall plot analysis may be performed. A mitigation action may be performed when a deviation from steady state within the Hall plot analysis for at least one well is beyond a threshold of 5%.

The mitigation action may reduce the deviation in the Hall plot analysis from steady state. Such mitigation actions may comprise reservoir stimulation. Suitable examples of reservoir stimulation include, but are not limited to, acid stimulation, hydraulic fracturing, thermal stimulation, the like, and any combination thereof.

EXAMPLES

Figure 2:
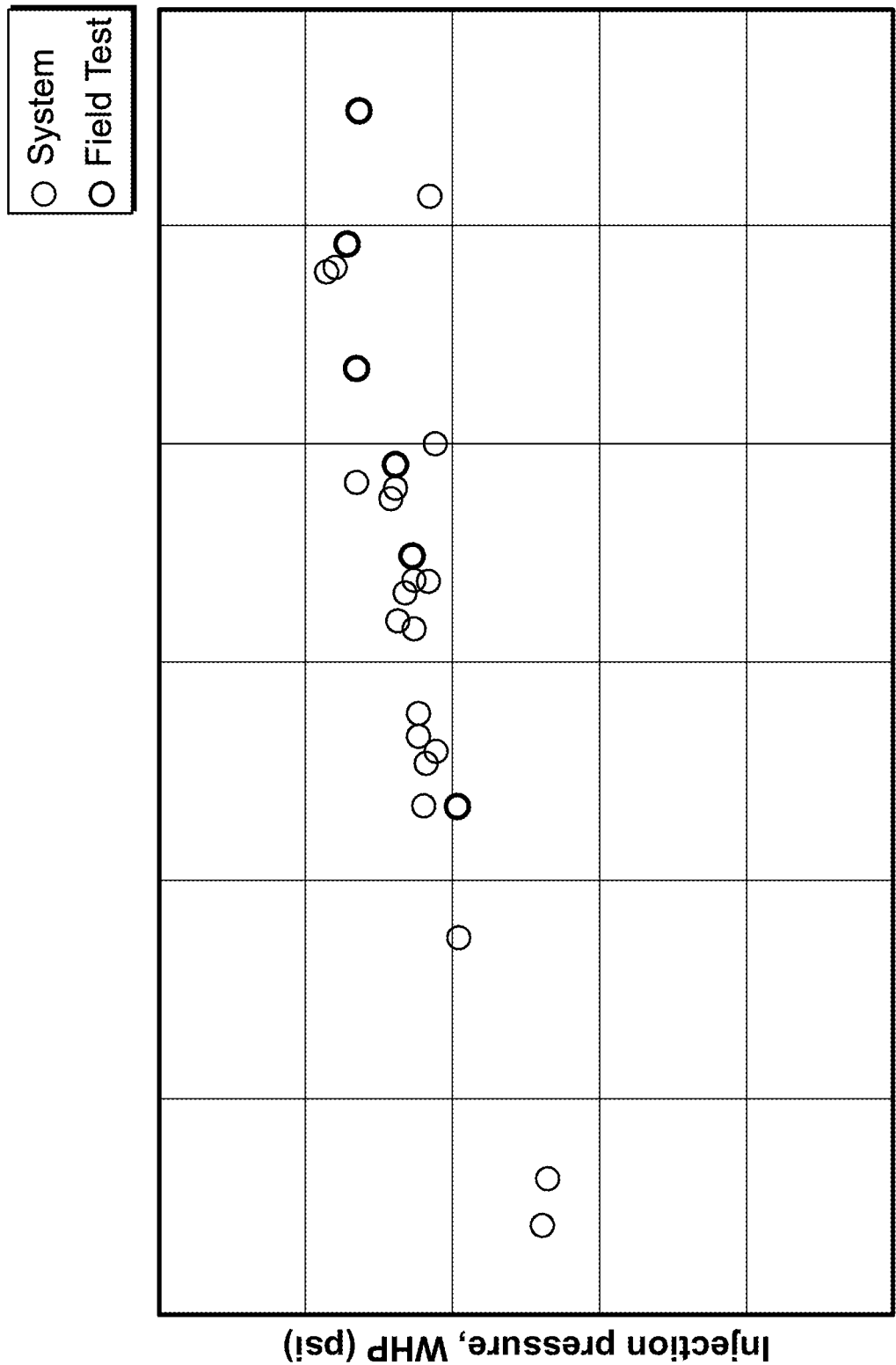
FIG. 2 is a graph comparing the step-rate plot developed from a step-rate analysis and the step-rate plot developed using experimental data.

The methods of the present disclosure were used to monitor the performance of a power water injector in a waterflood system of a subterranean formation. Distributed acoustic sensing was used to receive Rayleigh signals from an optical fiber deployed in the subterranean formation. The Rayleigh signals were processed and used to perform a step-rate analysis and develop a step-rate plot (FIG. 1). The developed step-rate plot was compared to a step-rate plot that was developed experimentally for the subterranean formation, (FIG. 2). As shown in FIG. 2, the mathematically-derived and the experimental step-rate plots are strongly correlated.

Figure 3:
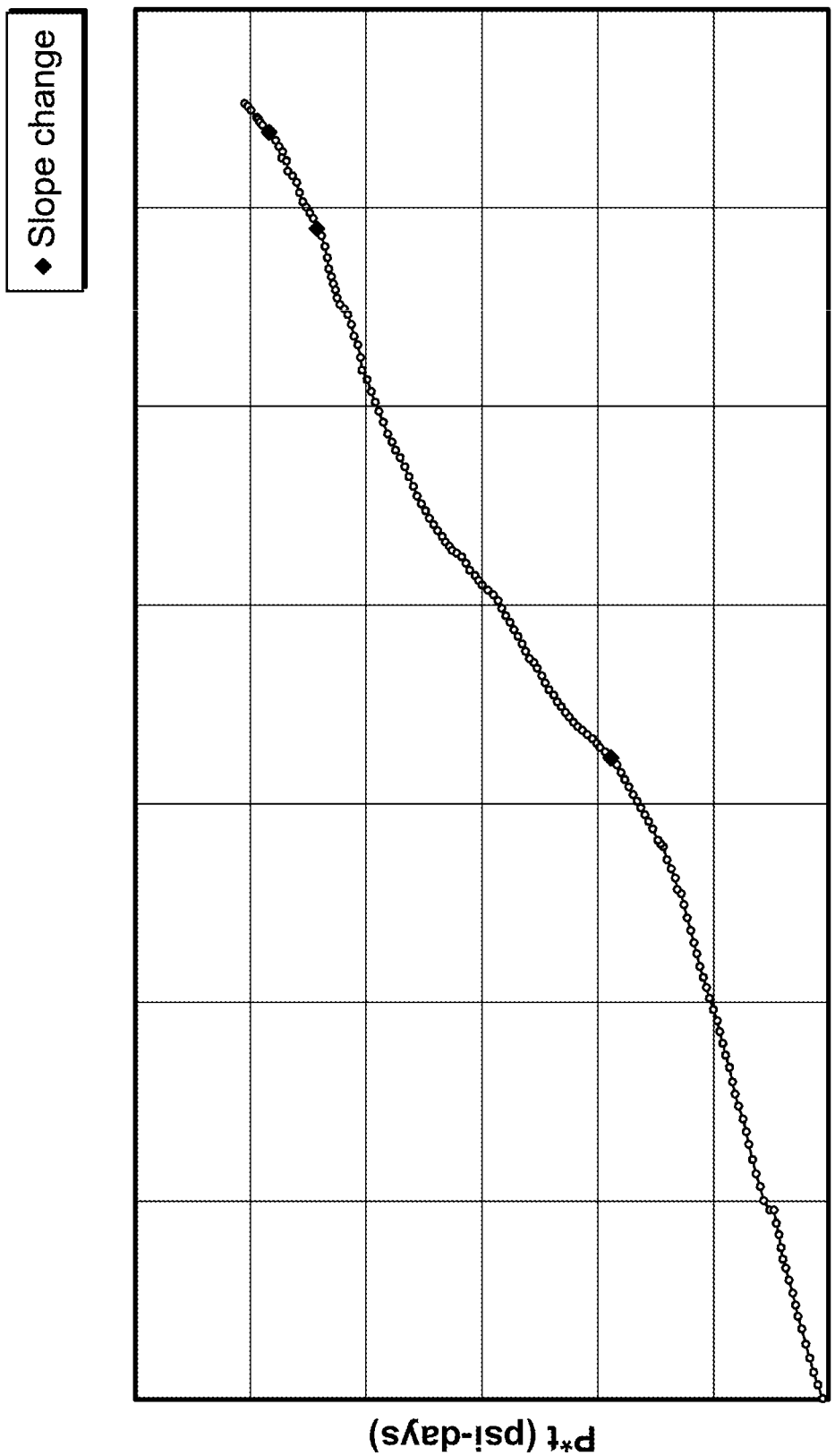
FIG. 3 is a Hall plot developed from a Hall plot analysis of a subterranean formation.

In addition to the step-rate analysis, a Hall plot analysis was performed given the volumetric flow rate and pressure data of water injected into the subterranean formation. The Hall plot from the Hall plot analysis is shown in FIG. 3. The analysis detected three deviations from steady state, resulting in the performance of a mitigating action in the form of acid stimulation.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method comprising:
   receiving a plurality of signals from a sensor deployed in a subterranean formation;
   performing a step-rate analysis for the subterranean formation using the plurality of signals;
   determining an ideal volumetric flow rate and an ideal pressure of water injected into the subterranean formation by a power water injector from the step-rate analysis;
   continuously determining a cumulative volume of water and a cumulative pressure of water injected into the subterranean formation to obtain a plurality of cumulative injected water data points and a plurality of cumulative pressure data points;
   performing a Hall plot analysis of the plurality of cumulative injected water data points and the plurality of cumulative pressure data points; and
   performing a mitigation action when a deviation from steady state within the Hall plot analysis is beyond a constant factor, wherein the mitigation action reduces the deviation from steady state.

2. The method of claim 1, wherein the mitigation action comprises reservoir stimulation.

3. The method of claim 1, wherein the plurality of signals are received using distributed acoustic sensing.

4. The method of claim 1, wherein the cumulative volume of water is a multiplication product of a volumetric flow rate of water injected into the subterranean formation and a period of time.

5. The method of claim 4, wherein the cumulative pressure of water is a multiplication product of a pressure of water injected into the subterranean formation and the period of time.

6. The method of claim 1, wherein the step-rate analysis is used to develop a step-rate plot.

7. The method of claim 1, wherein the Hall plot analysis is used to develop a Hall plot.

8. The method of claim 1, wherein the step-rate analysis is calibrated using experimentally collected step-rate data.

9. The method of claim 1, wherein the sensor comprises an optical fiber.

10. A method comprising:
    receiving a plurality of signals from a sensor deployed in a subterranean formation, wherein the subterranean formation comprises a plurality of wells;
    performing a step-rate analysis for the subterranean formation using the plurality of signals;
    determining an ideal volumetric flow rate and an ideal pressure of water injected into the plurality of wells by a plurality of power water injectors from the step-rate analysis;
    continuously determining a cumulative volume of water and a cumulative pressure of water injected into each well to obtain a plurality of cumulative injected water data points and a plurality of cumulative pressure data points for each well;
    performing a Hall plot analysis of the plurality of cumulative injected water data points and the plurality of cumulative pressure data points for each well; and
    performing a mitigation action when a deviation from steady state within the Hall plot analysis for at least one well is beyond a constant factor, wherein the mitigation action reduces the deviation from steady state.

11. The method of claim 10, wherein the mitigation action comprises reservoir stimulation.

12. The method of claim 10, wherein the plurality of signals are received using distributed acoustic sensing.

13. The method of claim 10, wherein the cumulative volume of water is a multiplication product of a volumetric flow rate of water injected into the well and a period of time.

14. The method of claim 13, wherein the cumulative pressure of water is a multiplication product of a pressure of water injected into the well and the period of time.

15. The method of claim 10, wherein the step-rate analysis is used to develop a step-rate plot.

16. The method of claim 10, wherein the Hall plot analysis is used to develop a Hall plot.

17. The method of claim 10, wherein the step-rate analysis is calibrated using experimentally collected step-rate data.

18. The method of claim 10, wherein the sensor comprises an optical fiber.

* * * * *